US005790781A

United States Patent [19]
Cox et al.

[11] Patent Number: 5,790,781
[45] Date of Patent: Aug. 4, 1998

[54] DYNAMIC SCALING OF CPU CYCLE CONSUMPTION IN AN I/O SUBSYSTEM OF A COMPUTER SYSTEM

[75] Inventors: Daniel R. Cox, Hillsboro; Jeremy Gaylord, Portland, both of Oreg.

[73] Assignee: Intel Corporation, Santa Clara, Calif.

[21] Appl. No.: 785,574

[22] Filed: Jan. 21, 1997

Related U.S. Application Data

[63] Continuation of Ser. No. 163,921, Dec. 8, 1993, abandoned.

[51] Int. Cl.$^6$ .................................................. G06F 11/00
[52] U.S. Cl. ...................... 395/184.01; 371/5.1; 371/5.5
[58] Field of Search ................... 395/184.01, 185.04, 395/185.09, 200.11, 200.13; 371/5.1, 5.2, 5.3, 5.4, 5.5

[56] References Cited

U.S. PATENT DOCUMENTS

| | | | |
|---|---|---|---|
| 3,676,859 | 7/1972 | Hollaway et al. | 371/5.5 |
| 4,309,771 | 1/1982 | Wilkens | 375/58 |
| 4,351,059 | 9/1982 | Gregoire et al. | 375/10 |
| 4,513,343 | 4/1985 | Ryczek | 361/101 |
| 4,606,044 | 8/1986 | Kudo | 371/5.5 |
| 4,710,925 | 12/1987 | Negi | 371/5.5 |
| 4,736,388 | 4/1988 | Eguchi | 371/5.5 X |
| 4,748,625 | 5/1988 | Krause et al. | 371/5.5 |
| 4,939,731 | 7/1990 | Reed et al. | 371/5.5 |
| 4,991,184 | 2/1991 | Hashimoto | 371/5.5 |
| 5,067,128 | 11/1991 | Nakane | 371/5.5 |
| 5,159,611 | 10/1992 | Tomita et al. | 375/34 |
| 5,199,061 | 3/1993 | Kim | 371/5.5 |
| 5,268,906 | 12/1993 | Free | 371/5.5 |
| 5,313,642 | 5/1994 | Seigel | 395/75 |
| 5,428,638 | 6/1995 | Ciojji et al. | 375/224 |

*Primary Examiner*—Robert W. Beausoliel, Jr.
*Assistant Examiner*—Dieu-Minh Le
*Attorney, Agent, or Firm*—Blakely, Sokoloff, Taylor & Zafman

[57] ABSTRACT

A method for dynamically scaling consumption of processor cycles by a task executing in a multi-tasking input/output subsystem, wherein a performance task executing in the multi-tasking input/output subsystem determines a real-time error measure that indicates a number of real-time errors logged by at least one input/output driver executing in the multi-tasking input/output subsystem. If the measure of real-time data gathering errors exceeds a predetermined threshold, then the consumption of processor cycles consumed by the task is reduced.

11 Claims, 7 Drawing Sheets

DYNAMIC SCALING OF CPU CYCLE CONSUMPTION IN AN I/O SUBSYSTEM OF A COMPUTER SYSTEM

This is a continuation of application Ser. No. 08/163,921, filed Dec. 8, 1993, now abandoned.

BACKGROUND OF THE INVENTION

1. Field of the Invention

The present invention pertains to the field of personal computer systems. More particularly, this invention relates to a multi-tasking multi-function input/output subsystem for a personal computer that dynamically scales the processor cycle consumption of tasks according to real-time error rates.

2. Art Background

Personal computer systems commonly employ communication input/output subsystems that enable modem or fax communication over a telephone line. Some prior communication subsystems enable both fax and data modem transfers over a common telephone line. A communication subsystem that enables both modem and fax transfers is commonly referred to as a fax-modem.

Such prior communication subsystems typically contain a central processing unit (CPU) for executing telephony hardware driver software, and telephony control hardware for physically driving the telephone line. Typically, such communication subsystems implement a read only memory (ROM) based telephony hardware driver. The telephony hardware driver usually receives control messages and data from the host computer, and performs the required hardware control functions to transfer information over the telephone line.

A personal computer system may contain a multi-function input/output (I/O) subsystem that provides a CPU with a multi-tasking operating system. Such a multi-function I/O subsystem may provide tasks that perform a variety of functions supported by the hardware. For example, such a multi-function I/O subsystem could implement telephony hardware that enables data modem and fax transfers over a telephone line. Such a multi-function I/O subsystem could also provide audio control hardware to enable audio I/O functions for the personal computer.

One drawback of such a multi-tasking I/O subsystem is that certain I/O tasks require large amounts of CPU time. Such tasks are typically assigned the highest priority for execution. For example, a modem data transfer task executing in the multi-function I/O subsystem is usually assigned a high priority. In general, the high priority I/O intensive tasks typically consume large amounts of CPU cycles or MIPS (millions of instructions per second).

Unfortunately, such high priority I/O intensive tasks can consume most of the MIPS available in the multi-function I/O subsystem. The lower priority I/O tasks executing on the multi-function I/O subsystem may not receive enough MIPS to properly execute. As a consequence, the lower priority tasks I/O tasks are subject to real-time errors. For example, a low priority audio recording task is subject to real-time errors during audio data gathering while a high priority data modem task is consuming most of the available MIPS by performing a high baud rate file transfer.

SUMMARY AND OBJECTS OF THE INVENTION

One object of the present invention is to dynamically scale the MIPS consumption of I/O tasks in a multi-function I/O subsystem in response to real-time errors.

Another object of the present invention is to provide a performance monitoring task for the multi-function I/O subsystem that determines a measure of real-time errors caused by the exhaustion of available processor MIPS in the multi-function I/O subsystem.

A further object of the present invention is to provide I/O tasks in the multi-function I/O subsystem that retrieve the measure of real-time errors and accordingly reduce MIPS consumption if necessary.

A further object of the present invention is to provide modem data transfer tasks in the multi-function I/O subsystem that retrieve the measure of real-time errors and that renegotiate the modem data transfer to reduce the MIPS consumption if the measure of real-time errors exceeds a predetermined threshold.

These and other objects of the invention are provided by a method for dynamically scaling consumption of processor cycles by a task executing in a multi-tasking input/output subsystem. A performance task executing in the multi-tasking input/output subsystem determines a real-time error measure that indicates a number of real-time errors logged by at least one input/output driver executing in the multi-tasking input/output subsystem. If the measure of real-time errors exceeds a predetermined threshold, then the consumption of processor cycles by the task is reduced.

The input/output driver logs a real-time error if an input/output task corresponding to the input/output driver does not allocate a data buffer for transferring a set of sampled data to the input/output task such that the set of sampled data is overrun by a subsequent set of sampled data received by the input/output task. For one embodiment, the real-time error measure is determined by averaging the number of real time errors logged by the input/output driver during a preceding predetermined time interval.

For one embodiment, the task is a modem task that transfers a modem data stream over a telephone line through a telephony driver according to a data transfer rate equal to a first baud rate. The modem task reduces the consumption of processor cycles by renegotiating the data transfer rate to a second baud rate such that the second baud rate is less than the first baud rate.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
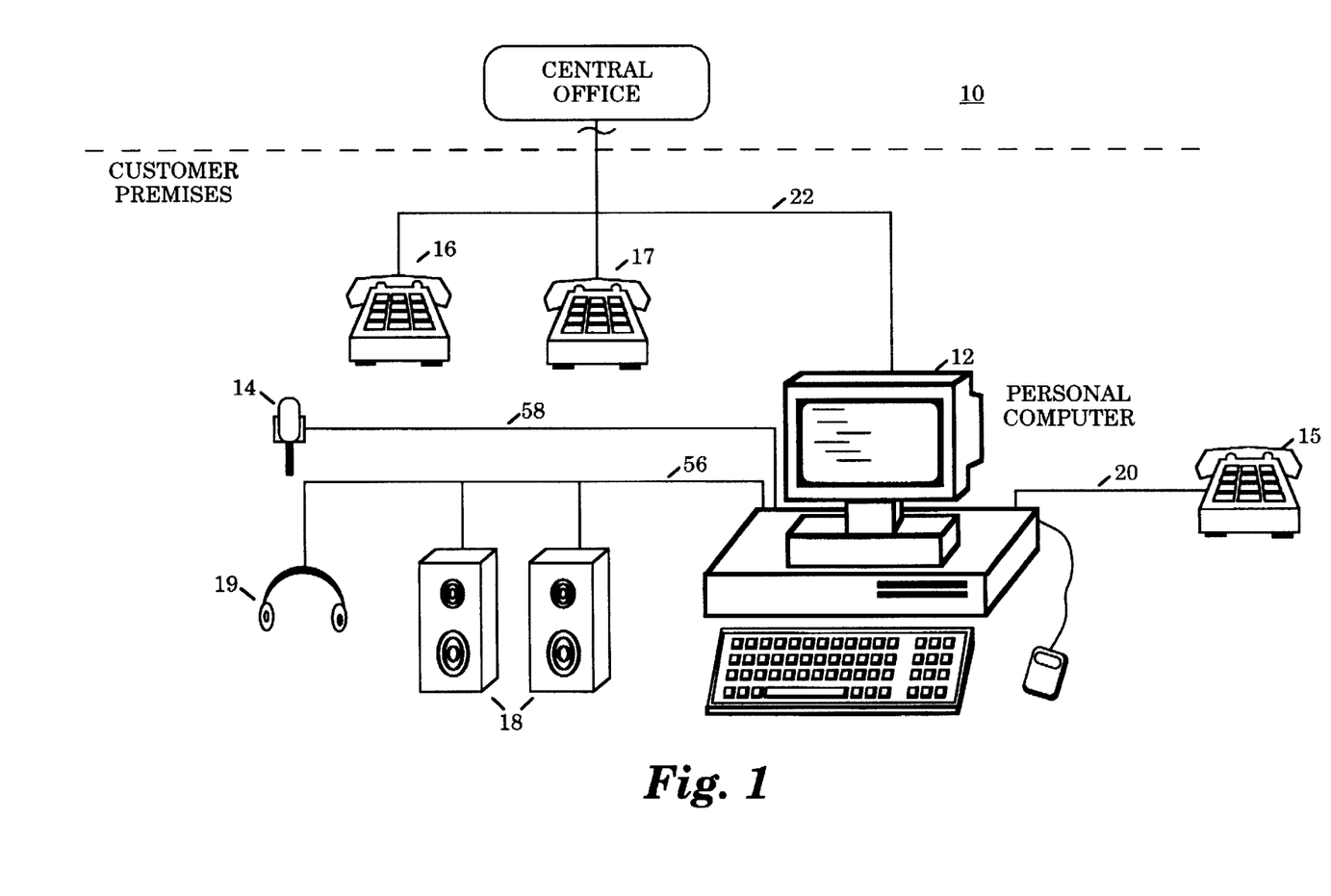
FIG. 1 illustrates a telephone system for one embodiment which includes a personal computer that receives incoming calls and transmits outgoing calls over a telephone line.

FIG. 1 illustrates a computer system 10 for one embodiment. The computer system 10 includes a personal computer 12 that receives incoming calls and transmits outgoing calls over a telephone line 22. The telephone line 22 comprises a standard telephone line or alternatively a private branch exchange (PBX) line or ISDN connection.

A pair of telephones 16 and 17, along with a telephone answering machine 18 are coupled to the telephone line 22 in parallel with the personal computer 12. A serial telephone 15 is coupled to the personal computer 12 over a local line 20.

Figure 2:
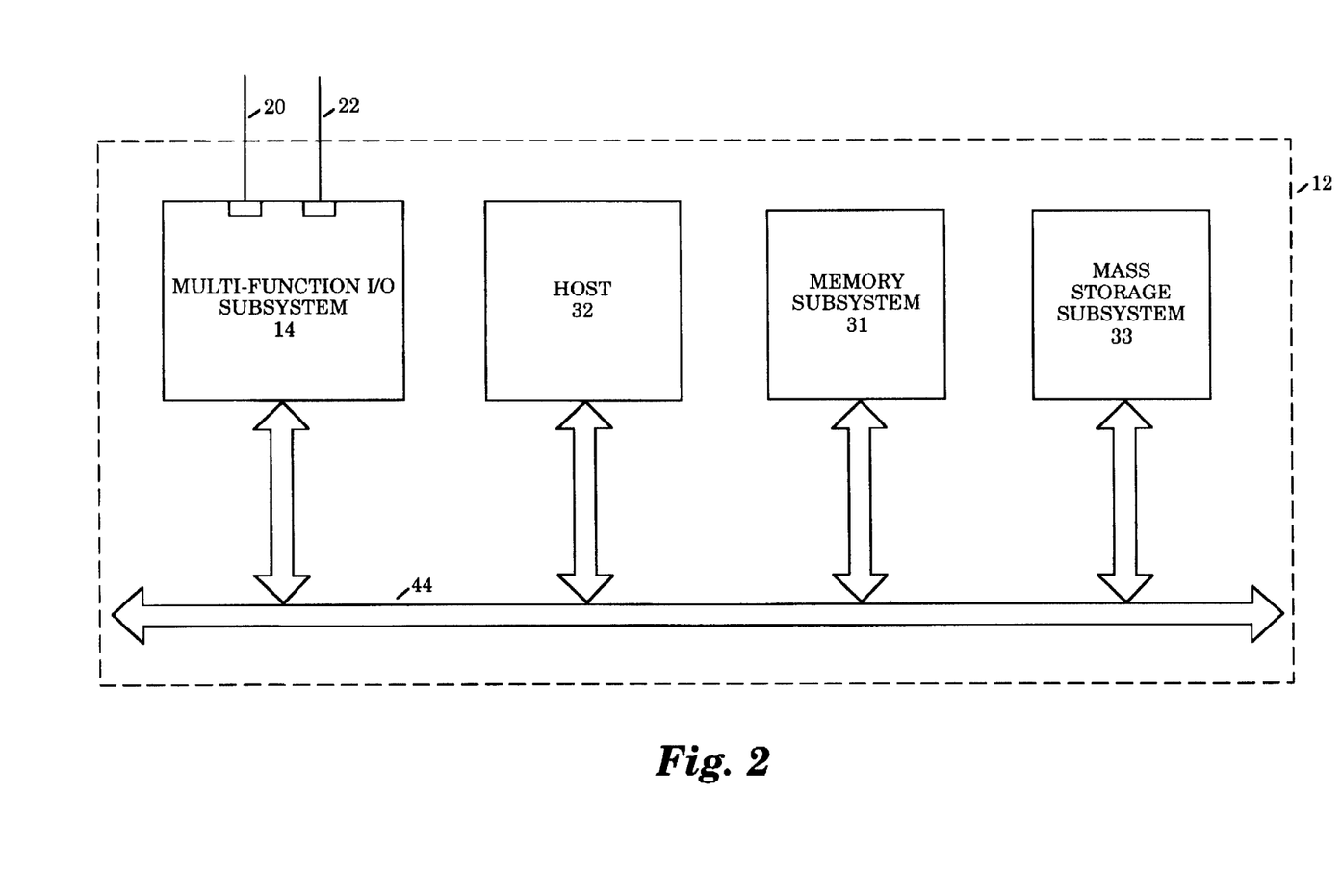
FIG. 2 illustrates the personal computer which comprises a host processor, a memory subsystem, a mass storage subsystem, and a multifunction I/O subsystem.

FIG. 2 illustrates the personal computer 12. The personal computer 12 comprises a host processor 32, a memory subsystem 31, a mass storage subsystem 33, and a multifunction I/O subsystem 14. The host processor 32, the memory subsystem 31, and the multifunction I/O subsystem 14 communicate over a host bus 44.

The multifunction I/O subsystem 14 provides sound capture/playback functions, fax and data modem functions, and telephone control functions. The multifunction I/O subsystem 14 provides connections for microphones and speakers, and hardware to support telephone and telephone line connections.

The mass storage subsystem 33 represents a wide variety of mass storage devices for large scale data and program storage, including magnetic disk drives and CD ROM drives.

Figure 3:
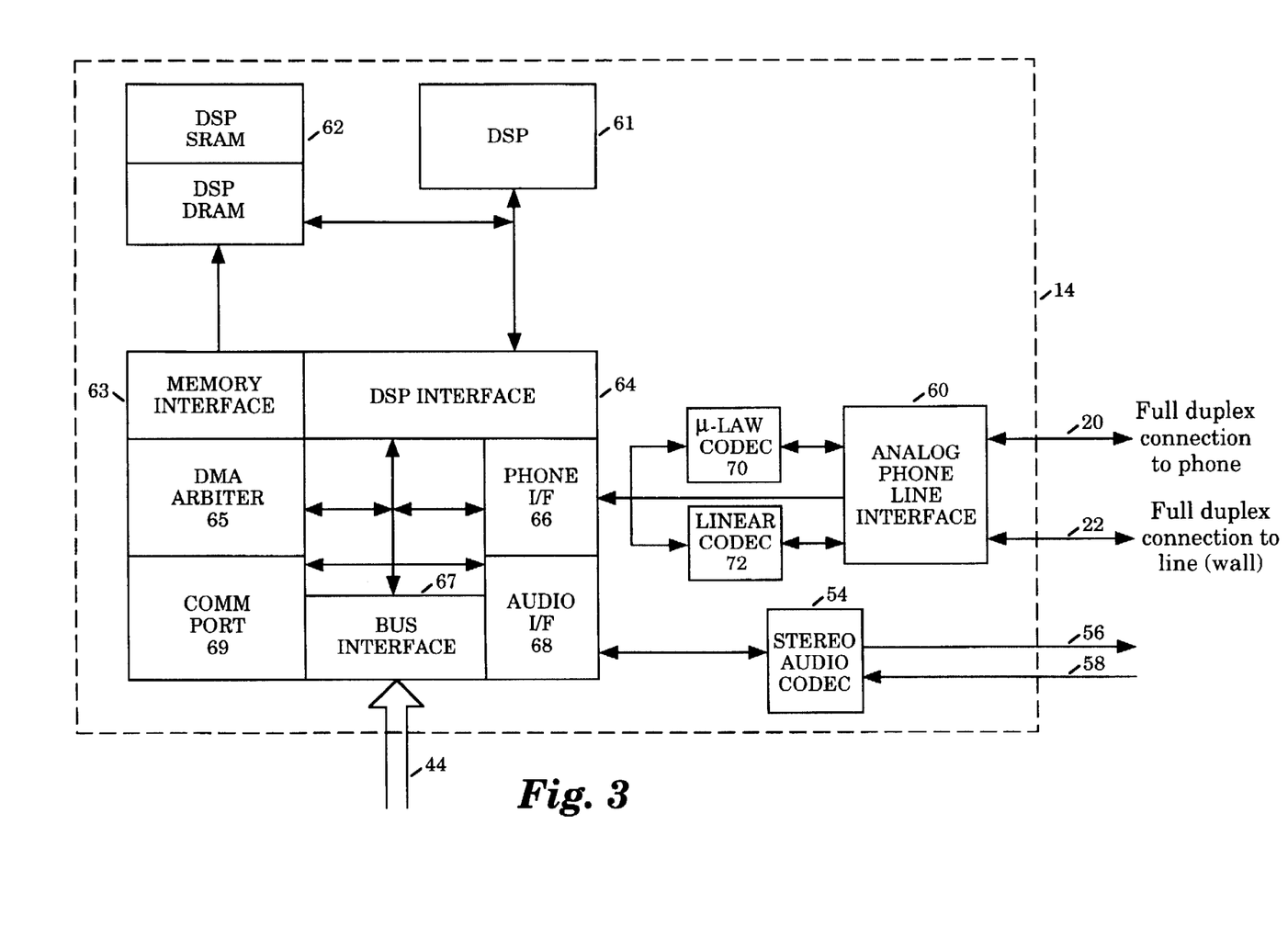
FIG. 3 is a diagram illustrating the multifunction I/O subsystem which comprises an analog phone line interface circuit and associated codec circuits, a digital signal processor, an stereo audio codec circuit, and a set of interface circuits.

FIG. 3 is a diagram illustrating the multifunction I/O subsystem 14. The multifunction I/O subsystem 14 comprises an analog phone line interface circuit 60 and associated codec circuits (a µ-law codec 70 and a linear codec 72), a digital signal processor (DSP) 61, an stereo audio codec circuit 54, and a set of interface circuits 63–69.

A memory block 62 comprises a DSP static random access memory (SRAM) and a DSP dynamic random access memory (DRAM). Both DRAM and SRAM can be used for program or data.

The bus interface circuit 67 and the DMA arbiter circuit 65 enable the DSP 61 to communicate over the host bus 44.

The analog phone line interface circuit 60 and the µ-law and linear codec circuits 70 and 72 enable transfer of incoming and outgoing calls over the local line 20 and the telephone line 22 including full duplex connections between the µ-law codec 70 and the telephone 15 and full duplex connections between linear codec 72 and the telephone line 22. The µ-law phone and linear line codec circuits 70 and 72 transfer digital data to and from the DSP 61 through the phone interface circuit 66.

The stereo audio codec circuit 54 transfers audio signals (mono and stereo) to the external speakers 18 and the headphone set 19 over a set of audio signal lines 56. The stereo audio codec circuit 54 also receives audio signals (mono and stereo) from an audio source and external microphone 14 over a set of audio signal lines 58. The stereo audio codec circuit 54 performs analog-to-digital conversion on the received audio signals, and transfers the digitized audio data to the audio interface (I/F) circuit 68. The stereo audio codec circuit 54 performs digital-to-analog conversion on audio data received through the audio interface (I/F) circuit 68.

For one embodiment, the multifunction I/O subsystem 14 comprises an industry standard architecture (ISA) add-in card that provides hardware to support audio and telephony applications.

Figure 4:
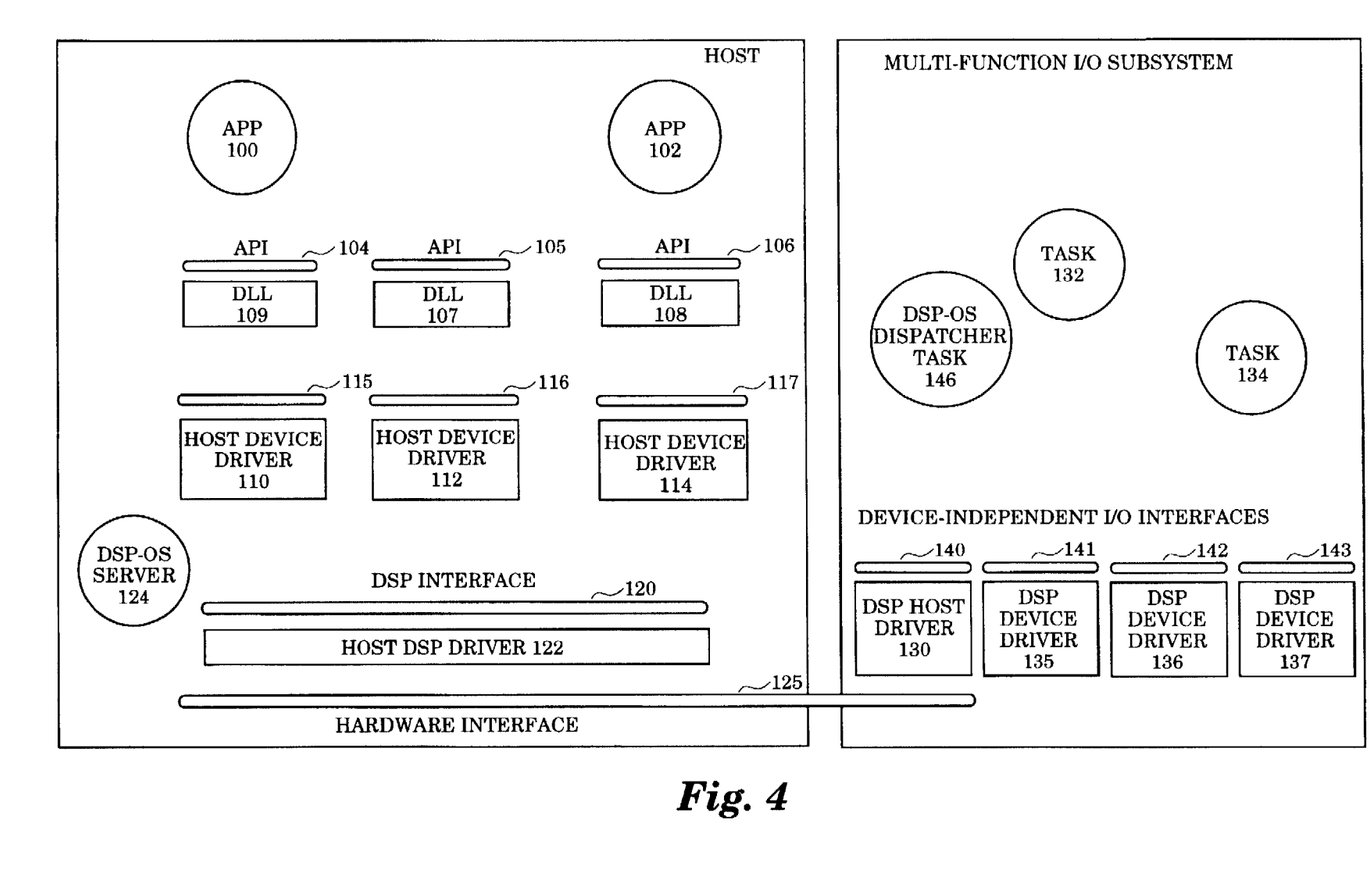
FIG. 4 illustrates the software architecture for the host processor and the multifunction I/O subsystem.

FIG. 4 illustrates the software elements for the host processor 32 and the multifunction I/O subsystem 14. A set of application programs 100–102 executing on the host processor 32 access the hardware functions of the multifunction I/O subsystem 14 through an application program interface (API) 104–106.

An application program interface consists of a dynamic link library (DLL) layer and a corresponding host device driver. The dynamic link library layer interacts with host application programs that use the corresponding application program interface. The dynamic link library layer performs error checking and translates application program calls into messages that are passed to the appropriate device driver.

For example, the application program interface 104 provides dynamic link library 109 that links at runtime to a host device driver that communicates with a hardware device in the multifunction I/O subsystem 14. The dynamic link library 109 translates the application program interface 104 calls into messages that are passed to the device driver which performs the requested function.

The dynamic link library layers 107–109 of the application program interfaces 104–106 interact with one or more host device drivers 110–114 via common device driver interfaces 115–117. The host device drivers 110–114 are implemented as dynamic link libraries. A set of device-type specific custom messages are defined by the device driver for the corresponding device class.

The code for the application program interfaces 104–106 comprises the dynamic link libraries 107–109. The application programs 100–102 that require the services provided by the application program interfaces 104–106 link against the library corresponding to the corresponding dynamic link library 107–109.

The dynamic link libraries 107–109 translate application program interface calls into host device driver calls or messages. The host device driver calls or messages and associated data structures define the device driver interface (DDI) for the corresponding device class. A host device driver for an application program interface is provided by implementing the corresponding DDI.

The multifunction I/O subsystem 14 implements a digital signal processing operating system (DSP-OS) that executes on the DSP 61. The DSP-OS enables multiple concurrent execution of audio and telephony tasks (such as a DSP-OS task 132 and a DSP-OS task 134) on the multifunction I/O subsystem 14.

The DSP-OS is a real time multitasking operating system that provides two programming interfaces: the application programming interface and a system programming interface (SPI). The DSP-OS application program interface provides a set of high-level processor independent functions for computations by the DSP 61, as well as stream input and output to the multifunction I/O subsystem 14.

The software for the multifunction I/O subsystem 14 includes a set of DSP device drivers 130 and 135–137. The DSP-OS tasks 132–134 perform computations and I/O to devices via the DSP device drivers 135–137.

A typical DSP-OS task reads input data from a hardware device, processes the input data, and then writes output data to another hardware device. Normally, multiple DSP-OS tasks perform such processes concurrently. A DSP device driver enables the DSP-OS tasks to access hardware devices. Each hardware device corresponds to a DSP device driver that manages the hardware device and provides I/O services to the DSP-OS tasks.

The DSP-OS system programming interface provides a set of functions for managing DSP-OS tasks, and for managing the DSP memory 62. The DSP-OS system programming interface provides functions for synchronizing DSP-OS tasks, and functions for performing device-independent I/O.

The host device drivers 110–114 communicate with DSP programs executing on the multifunction I/O subsystem 14 through a DSP interface 120. For example, a host audio device driver uses the DSP interface 120 to control a DSP-OS task that manages data transfer to and from the stereo audio codec circuit 54. The host audio device driver can communicate with several DSP-OS tasks. A DSP-OS task created by a host device driver may create other DSP-OS tasks to provide the appropriate hardware functions.

The DSP interface 120 is message-based. The DSP interface 120 defines a common structure for messages and a programming model for communication between host device drivers and corresponding DSP-OS tasks. Each host device driver defines an appropriate set of message formats (such as command codes, parameters, status and reply codes, etc.) for communication with the corresponding DSP-OS task.

A host DSP driver 122 implements the DSP interface 120. The host DSP driver 122 comprises a dynamic link library (DLL) that enables communication with the multifunction I/O subsystem 14. The host DSP driver 122 loads the DSP-OS and starts the DSP 61 to initialize the multifunction I/O subsystem 14 and run the DSP-OS. After the multifunction I/O subsystem 14 is initialized and the DSP-OS is running, the host DSP driver 122 moves buffers of data and messages between the host processor 32 and the multifunction I/O subsystem 14.

The host DSP driver 122 communicates with a DSP host driver 130 executing under the DSP-OS. The host DSP driver 122 and the DSP host driver 130 do not examine the content of the data and messages passed over the hardware interface 125. The host DSP driver 122 and the DSP host driver 130 synchronize multiple data and message streams and route each stream to the appropriate host device driver and DSP-OS task.

A DSP-OS server 124 executing on the host processor 32 functions as a server for the DSP-OS tasks 132–134 and 146. The DSP-OS server 124 processes requests from the multifunction I/O subsystem 14. The DSP-OS server 124 is a "daemon" on the host processor 32. The DSP-OS server 124 is a part of the host DSP driver 122. The DSP-OS server 124 server services file and console I/O requests from the DSP-OS tasks 132–134 and 146 to the host processor 32. The DSP-OS server 124 assists in dynamic DSP-OS task loading, and provides a user interface for status and performance monitoring of the multifunction I/O subsystem 14.

The DSP-OS is a real-time multitasking operating system that provides a kernel and input/output (I/O) environment for the software executing on the multifunction I/O subsystem 14. The DSP-OS defines a set of device-independent I/O interface 140–143 for use by the DSP-OS tasks 132–134 and 146 to access hardware devices of the multifunction I/O subsystem 14. The DSP-OS also defines stackable device drivers which are blocks of code that provide common (i.e., reusable) transformations on I/O streams in the standard format.

A DSP program executing on the DSP 61 functions as a server for a corresponding client host device driver on the host processor 32. A DSP program performs the commands requested by the client host device driver through the appropriate messages.

A DSP program consists of one or more DSP-OS tasks that move data from source devices to sink devices, while performing specific processing and transformations on the data. For example, an audio DSP-OS task reads audio samples from the stereo audio codec circuit 54 using a device independent I/O interface, processes the samples to perform data compression, and then transfers the compressed data to the host audio device driver executing on the host processor 32.

The DSP-OS creates a DSP-OS dispatcher task 146 after starting up. The DSP-OS dispatcher task 146 processes requests from the host device drivers 110–114 to create and delete DSP-OS tasks. The DSP-OS dispatcher task 146 matches a task name to the appropriate DSP-OS tasks and then loads and starts the new DSP-OS tasks. The DSP-OS dispatcher task 146 also creates mailboxes for communications between the requesting host device driver or other DSP-OS tasks and the new DSP-OS task.

The functions of a DSP-OS task are controlled by placing messages in a corresponding mailbox. The interpretation of the messages follows a device-class specific protocol. Each DSP-OS task recognizes a small set of basic messages.

Figure 5:
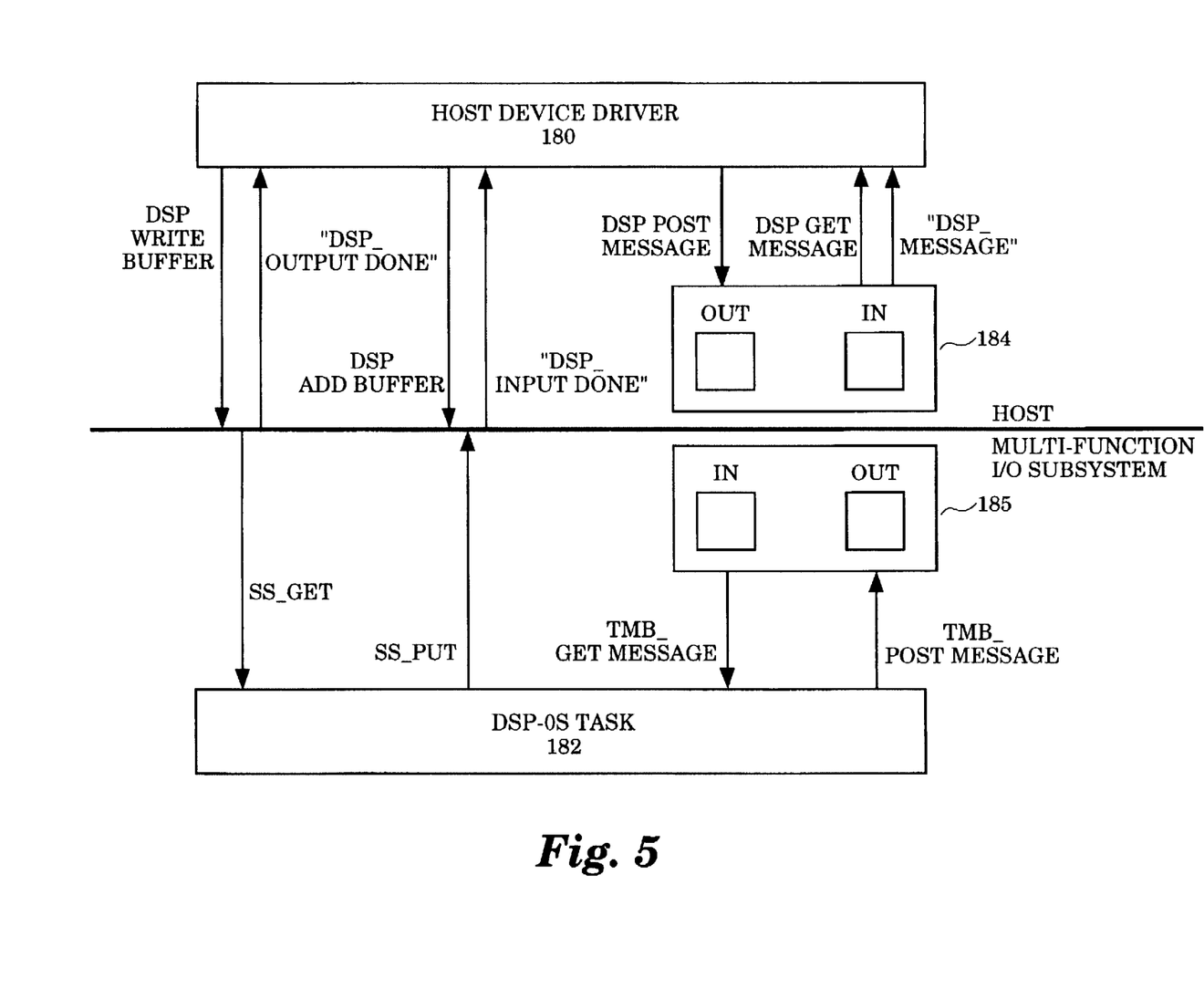
FIG. 5 illustrates interaction between a host device driver executing on the host processor and a corresponding DSP-OS task executing on the multifunction I/O subsystem.

FIG. 5 illustrates interaction between a host device driver 180 executing on the host processor 32 and a corresponding DSP-OS task 182. The host device driver 180 controls and communicates with the DSP-OS task 182 via a control channel and one or more data channels.

The DSP interface 120 provides the control channel that enables the host device driver 180 to send messages to the DSP-OS task 182, and receive messages from the DSP-OS task 182. The control channel is implemented according to a mailbox facility. The host device driver 180 calls a dspOpenTask routine to create the DSP-OS task 182, and to create a pair of mailboxes 184–185. The host device driver 180 and the DSP-OS task 182 use the mailboxes 184–185 to exchange messages.

Large data transfers between the host device driver 180 and the DSP-OS task 182 are subdivided into blocks according to a buffer size specified for the host device driver 180. The control channel messages are interleaved with data blocks.

The host device driver 180 and the DSP-OS task 182 exchange data through one or more data streams. A data stream is a channel that provides data flow in one direction between a host device driver and a DSP-OS task. Two data channels are employed to exchange data in both directions, i.e. from the host device driver 180 to the DSP-OS task 182 and from the DSP-OS task 182 to the host device driver 180.

The DSP interface 120 supplies a uniform set of services for communication with the multifunction I/O subsystem 14. For one embodiment, the DSP interface 120 supplies the communication services for the multifunction I/O subsystem 14 in a Microsoft® Windows environment. The services are employed by the application programs 100–102 and the host device drivers 110–114.

Each host device driver 110–114 starts and stops at least one DSP-OS task, and transfers data streams to and from the DSP-OS task. The DSP interface 120 is optimized for efficient data streaming to the DSP-OS task. The DSP interface 120 enables command message transfer between the host device drivers 110–114 and the DSP-OS tasks.

The DSP interface 120 also provides basic control functions for the multifunction I/O subsystem 14. The control functions are employed by the DSP-OS server 124. The control functions provided by the DSP interface 120 include control functions for loading the DSP-OS program image, control functions for starting and stopping the DSP 61, as well as control functions for obtaining diagnostic and status information from the multifunction I/O subsystem 14.

An application executing on the DSP 61 consists of one or more DSP-OS tasks that typically performs computations. A DSP-OS task has an associated host device driver that functions as a server. The host device driver launches the DSP-OS tasks (via a call to dspOpenTask) and thereafter sends commands to the newly launched DSP-OS tasks. The DSP-OS tasks service requests from the corresponding host device driver. A host device driver and a corresponding DSP-OS task have a client/server relationship.

The DSP-OS tasks are created through the DSP-OS dispatcher task 146. The DSP-OS dispatcher task 146 is a special DSP-OS task created when the system starts up. The DSP-OS dispatcher task 146 communicates with the host DSP driver 122. The DSP-OS dispatcher task 146 sets up the DSP-OS environment on the multifunction I/O subsystem 14 and then assumes the role of a central control DSP-OS task. The DSP-OS dispatcher task 146 responds to a set of command messages from the host device drivers, including requests to create and delete a DSP-OS task.

The DSP-OS tasks send data to the host device drivers, and receive data from the host device drivers. A data streaming interface enables efficient transmission of data blocks (buffers). The data streaming interface is accessed through the DSP-OS. The host application programs access the data channels between a DSP-OS task and the corresponding host device driver through the host device driver. The DSP-OS tasks access files on the mass storage subsystem 33 through a corresponding host device driver.

The DSP-OS supports device independent I/O by providing a common set of functions used to access the differing hardware devices of the multifunction I/O subsystem 14 in a uniform manner. The DSP device drivers 130 and 135–137 implement the DSP-OS device-independent I/O interfaces 140–143 to enable access of the hardware devices of the multifunction I/O subsystem 14. The DSP-OS tasks 132–134 and 146 employ the device-independent I/O interfaces 140–143 to transfer data to or from any hardware device of the multifunction I/O subsystem 14 as a source or a sink The DSP-OS tasks 132–134 and 146 read input data from a source device, processes the input data, and then write the processed data to a sink device. An SS_get and an SS_put operation are used for such processing. The local line 20, the telephone line 22, the stereo audio codec circuit 54, and the hardware devices of the host processor 32 are available as sources and sinks. The mass storage subsystem 33 functions as multiple sinks and multiple sources simultaneously, such that multiple logical data channels are concurrently active.

The multifunction I/O subsystem 14 provides hardware devices that support multiple application program interfaces. For example, the stereo audio codec circuit 54 is employed for sound file input and output through an audio application program interface, and for telephone conversations through a telephony application program interface. The telephone line 22 is employed for telephone conversations through the telephony application program interface, for sending and receiving faxes through a fax application program interface, and for data modem processing. In all such cases, the particular hardware device is accessed via the DSP-OS device-independent I/O interface.

The hardware devices of the multifunction I/O subsystem 14 that generate and consume sampled sound data streams represent the sampled sound data in differing data formats. A hardware device or DSP device driver may represent sound data in amplitude normalized format, wherein the sound samples comprise 32-bit floating point left justified data values that are scaled to range from $-2^{}31$ to $2^{}31-1$ for conversion to 32-bit signed integers.

A hardware device or DSP device driver may represent sound data as 32-bit floating point right justified data values, wherein 8-bit sound samples range from $-256$ to $255$ and 16-bit sound samples range from $-32768$ to $32767$. A hardware device or device driver may represent sound data as 16-bit signed integer right justified data values with one sample per 32-bit word, wherein sound samples range from $-32768$ to $32767$.

A hardware device or DSP device driver may represent sound data as packed 16-bit integer data values, wherein a 32-bit word either represents left and right samples (stereo) or two successive samples (mono). In addition, 8-bit μ-law samples are packed four to a 32-bit word.

DSP-OS tasks employ a standard data format to represent sampled sound data streams for the multifunction I/O subsystem 14. The standard data format is 32-bit floating-point left-justified. The sound data stream samples are scaled to range between $-2^{}31$ an $2^{}31-1$. Such scaling enables efficient conversion between floating point and integer data formats.

The standard data format supports a range of $\pm(2)^{127}$. However, sound sample values having a magnitude greater than $2^{31}$ generate erroneous results if sent to a hardware device of the multifunction I/O subsystem 14. Also, sound sample values having a magnitude less than $2^{15}$ are equivalent to 0.

For example, the DSP device driver for the stereo audio codec 54 receives standard data format samples from a corresponding DSP-OS task, converts the standard data format samples into 32-bit integers, then right-shifts the 32-bit integers by 16 bits to extract the high-order 16 bits, and then writes the high-order 16 bits to the stereo audio codec 54.

For another example, a DSP device driver for telephony converts standard data format sound samples into 8-bit μ-law samples by converting the standard data format sound samples into 32-bit integers, then extracting the high-order 14 bits and converting the high-order 14 bits to 8-bit μ law.

The standard data format for sampled sound data streams enables the DSP-OS tasks to open and read sound samples from multiple hardware devices that require differing data formats. Similarly, the standard data format for sampled sound data streams enables the DSP-OS tasks to write sound samples to multiple hardware devices that require differing data formats.

The standard data format for sampled sound data streams also enables the DSP-OS tasks to communicate with devices that generate the same data format with differing scaling. For example, the stereo audio codec 54 generates true 16-bit integer samples that range from $-32768$ to $32767$, while the DSP device driver for the telephone line 22 converts 8-bit μ law sound samples into a linear integer format having a 14-bit range ($-4096$ to $4095$). The standard data format for sampled sound data streams enables compatibility if the sound samples for the telephone line 22 are left justified and the extra least significant bits set to zero.

Figure 6:
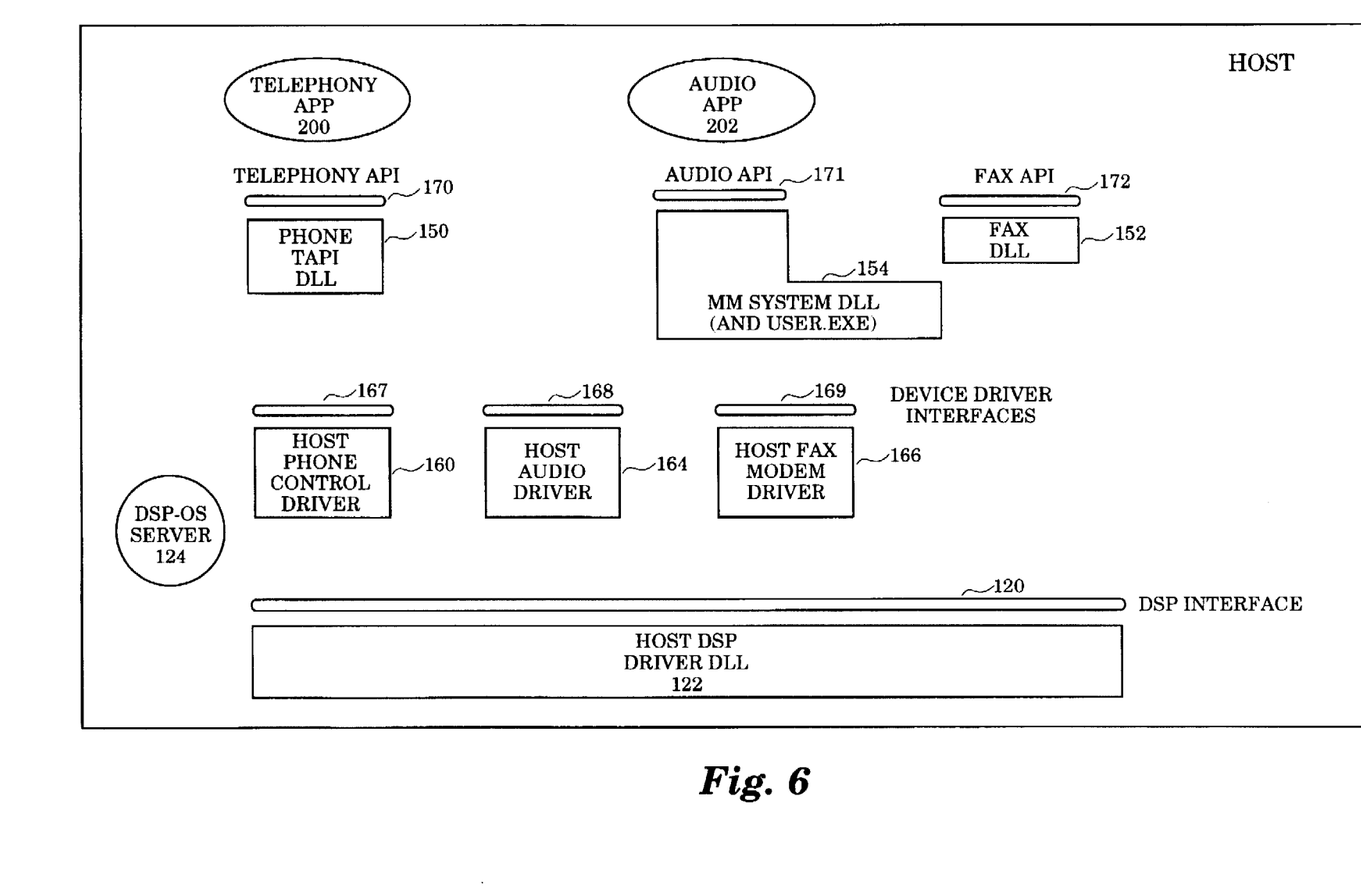
FIG. 6 illustrates the software architecture of the host processor for one embodiment.

FIG. 6 illustrates the software architecture of the host processor 32 for one embodiment. The host application programs on the host processor 32 comprise a host telephony application program 200 and a host audio application program 202.

The host telephony application program 200 enables origination and reception of voice calls, data modem calls, and fax calls over the telephone line 22. The host telephony application program 200 performs high-lever user interface functions and telephony handshake functions for handling the voice, data modem, and fax transfers over the telephone line 22.

The host telephony application program 200 communicates with a host phone control driver 160 and a host fax-modem driver 166 through a telephony application program interface 170. The host phone control driver 160 and the host fax-modem driver 166 communicate with corresponding DSP-OS tasks on the multifunction I/O subsystem 14 through the DSP interface 120 of the host DSP driver 122.

The telephony application program interface 170 provides telephony control services to the telephony application program 200. The telephony application program interface 170 provide services for handling inbound calls, for initiating outbound calls, for accessing features provided by the analog phone line interface circuit 70, and for communicating with remote equipment.

A fax application program interface 172 provides a set of fax control operations to the telephony application program 200. The fax application program interface 172 provides operations for managing incoming and outgoing faxes.

The host audio application program 202 enables recording and playback of sound files. The audio application program 202 enables transfer of information between sound files on the mass storage subsystem 33 and audio playback devices (not shown) coupled to the audio signal lines 56. The audio application program 202 also enables transfer of information between sound files on the mass storage subsystem 33 and the serial telephone 15 coupled to the local line 20.

The host audio application program 202 communicates with a host audio driver 164 through an audio application program interface 171. The host audio driver 164 communicates with corresponding DSP-OS tasks on the multifunction I/O subsystem 14 through the DSP interface 120 of the host DSP driver 122.

The functions provided by the audio application program interface 171 include querying audio devices, opening and closing audio devices, recording and playing audio data, and controlling playback and recording.

The host audio application program 202 also communicates with the host phone control driver 160 through the telephony application program interface 170 if the serial telephone 15 is employed as a sound file input/output device.

The host audio application program 202 implements a user interface function that enables a user of the personal computer 12 to select the serial telephone 15 as the sound file input/output device.

For one embodiment, the audio application program interface 171 comprises a Waveform application program interface provided by Microsoft® Corporation for processing Waveform sound files. The Waveform application program interface is part of Microsoft® Windows. The Waveform application program interface provides sound record and playback functions to Microsoft® Windows host applications.

Figure 7:
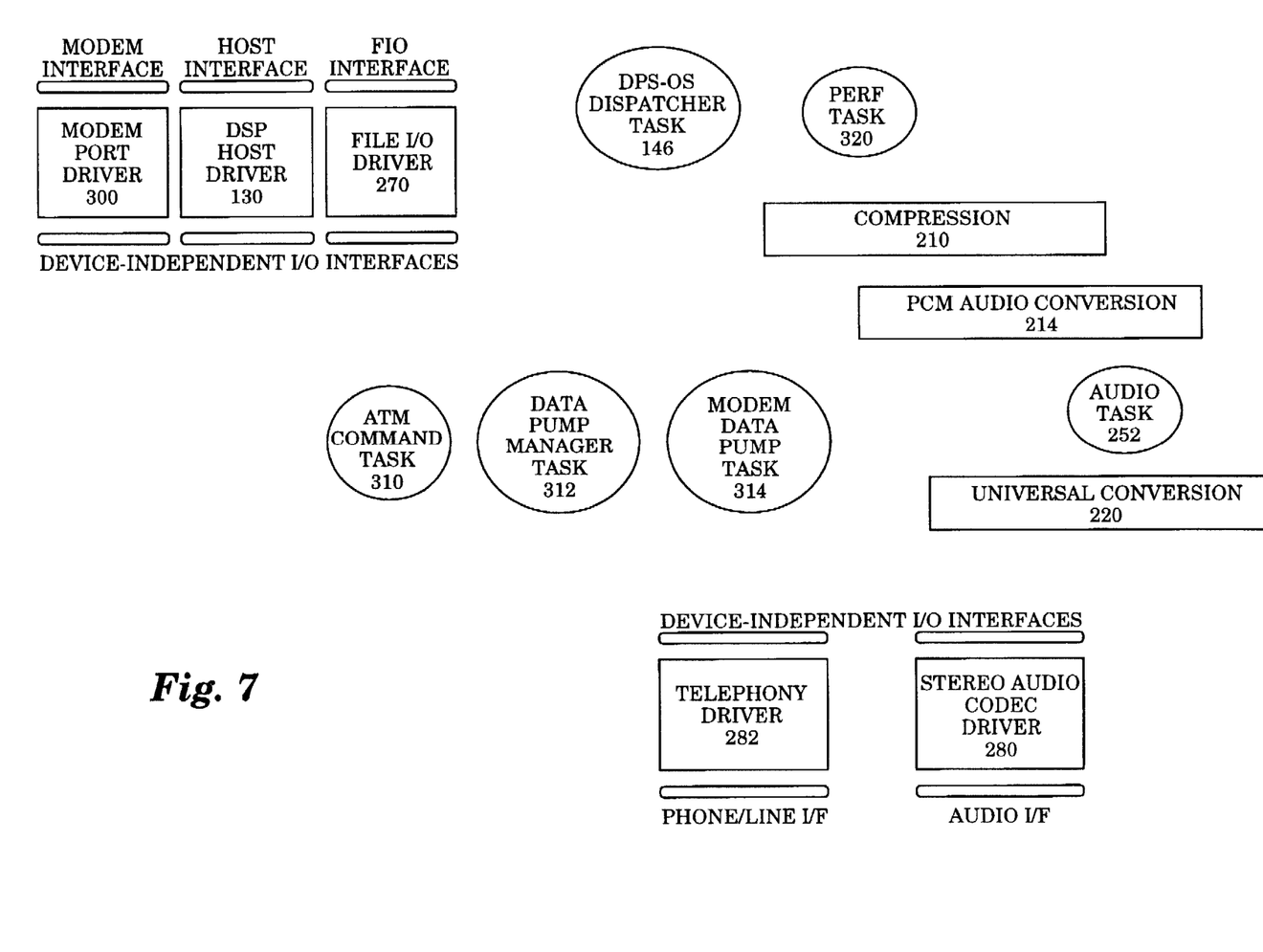
FIG. 7 illustrates the software architecture of the multifunction I/O subsystem for one embodiment.

FIG. 7 illustrates the software architecture of the multifunction I/O subsystem 14 for one embodiment. A DSP-OS dispatcher task 146 processes requests from the host phone control driver 160, the host audio driver 164 and the host fax-modem driver 166 to create and delete DSP-OS tasks.

The DSP-OS dispatcher task 146 matches the requested task name to the appropriate DSP-OS tasks and then loads and starts the new DSP-OS tasks. The DSP-OS dispatcher task 146 also creates mailboxes for communications between the host phone control driver 160 and the host fax-modem driver 166 and corresponding DSP-OS tasks. The DSP-OS dispatcher task 146 also creates mailboxes for communications between the host audio driver 164 and a corresponding DSP-OS task. The DSP-OS dispatcher task 146 also creates mailboxes for communications between the new DSP-OS tasks and other DSP-OS tasks.

A performance task 320 provides performance monitoring services for DSP-OS drivers and tasks. The performance task 320 provides real-time error logging and real-time error reporting functions for the DSP-OS drivers and tasks. The real-time error logging functions enable DSP-OS drivers to log real-time errors caused by exhaustion of available MIPS of the DSP 61.

The real-time error logging functions also enable the DSP-OS tasks that own the DSP-OS drivers to log real-time errors caused by exhaustion of available MIPS of the DSP 61. The DSP-OS tasks optionally query the corresponding DSP-OS drivers for real-time errors. Low priority DSP-OS tasks can disable logging of the real-time errors reported by the corresponding DSP-OS drivers. The selective enabling and disabling of real-time error logging by the DSP-OS tasks may be used to prevent selected low priority DSP-OS tasks from causing dynamic MIPS scaling in a higher priority DSP-OS task.

The performance task 320 determines a real-time error measure by smoothing the error logging information received from the DSP-OS drivers. The real-time error reporting functions enable DSP-OS tasks to retrieve the real-time error measure.

For one embodiment, the DSP-OS drivers log real-time errors by calling an error logging function of the performance task 320. The DSP-OS tasks perform error logging by periodically querying the corresponding DSP-OS driver or drivers. The DSP-OS tasks then log any real-time errors reported by the queried DSP-OS drivers by calling the error logging function of the performance task 320.

For another embodiment, the DSP-OS drivers log real-time errors by incrementing a global error count variable that is monitored by the performance task 320. The DSP-OS tasks perform error logging by periodically querying the corresponding DSP-OS driver or drivers and then incrementing the global error count variable of the performance task 320 according to the real-time errors reported by the queried DSP-OS drivers.

For one embodiment, the performance task 320 determines the real-time error measure by averaging the number of real-time errors logged by the DSP-OS drivers over a predetermined time interval. The performance task 320 periodically updates the real-time error measure. For example, the performance task 320 executes once each second and updates the real-time error measure by averaging the real-time errors logged during the previous one second interval. Alternatively, five and ten second time intervals are also suitable.

The DSP-OS tasks execute calls to the performance task 320 to retrieve the real-time error measure. High priority DSP-OS tasks use the real-time error measure to determine whether the available MIPS of the DSP 61 are being exhausted. A high priority DSP-OS task can accordingly take steps to reduce MIPS consumption. In addition, the DSP-OS dispatcher task 146 can prevent the launching of more DSP-OS tasks if the real-time error measure is maintained above a predetermined level. The DSP-OS dispatcher task 146 can also cause the host operating system to notify the user that the multifunction I/O subsystem is being overdriven by DSP-OS tasks.

A DSP file input/output (FIO) driver 270 enables access to host processor 32 file system by the DSP-OS tasks. The DSP-OS tasks use the DSP FIO driver 270 to perform open, read, write, and close operations, and to transfer data to and from files on the host processor 32 including files on the mass storage device 33.

The host phone control driver 160 and the host fax-modem driver 166 cause the DSP-OS dispatcher task 146 to create a set of modem DSP-OS tasks 310–314 for processing of data modem transfers over the telephone line 22. The host phone control driver 160 and the host fax-modem driver 166 communicate with the modem DSP-OS tasks 310—314 through a modem port driver 300. The modem port driver 300 implements a modem interface for the host telephony drivers. The modem port driver 300 communicates with the modem DSP-OS tasks 310–314 through the device independent I/O interface.

The modem DSP-OS tasks 310–314 perform telephony functions through a DSP telephony driver 282. The DSP telephony driver 282 communicates through the phone interface circuit 66 to the analog phone line interface circuit 60 and the codec circuits 70 and 72. The DSP telephony driver 282 is driven by interrupts generated by the phone interface circuit 66.

The attention to modem (ATM) command task 310 receives modem control commands from the host phone control driver 160 and the host fax-modem driver 166 through the modem port driver 300. The ATM command task 310 manages the data pump manager task 312 and the modem data pump task 314. The ATM command task 310 initially sets the baud rate for an outbound modem data transfer sequence.

The data pump manager task 312 functions as a server for the host phone control driver 160 and the host fax-modem driver 166. The data pump manager task 312 performs the commands requested by the host phone control driver 160 and the host fax-modem driver 166 according to messages routed through the corresponding mailboxes.

During outbound modem data transfer, the data pump manager task 312 receives an outbound modem data stream from the modem port driver 300. The data pump manager task 312 converts the outbound modem data stream into the standard data format. The data pump manager task 312 feeds the outbound modem data stream to the modem data pump task 314.

The modem data pump task 314 modulates the outbound modem data stream from the data pump manager task 312. The modem data pump task 314 transfers the modulated modem data stream to the telephony driver 282 through the device independent I/O interface. The telephony driver 282 converts the modulated modem data stream from the standard format into a format required by the codecs 70 and 72 and the analog phone line interface 60.

During inbound modem data transfer, the telephony driver 282 gathers line data through the codecs 70 and 72 and the analog phone line interface 60. The telephony driver 282 converts the data samples into an input modem data stream having the standard format. The telephony driver 282 transfers the standard format input modem data stream to the modem data pump task 314. The modem data pump task 314 demodulates the data samples and transfers the input modem data stream to the data pump manager task 312. The data pump manager task 312 transfers the input modem data stream to the modem port driver 300 through the device independent I/O interface. The modem port driver 300 transfers the input modem data stream to the host phone control driver 160 and the host fax-modem driver 166.

For one embodiment, the data pump manager task 312 periodically executes a call to the performance task 320 to retrieve the real-time error measure. If the real-time error measure exceeds a predetermined threshold error count, then the data pump manager task 312 renegotiates the baud rate for the modem data transfer sequence underway. For another embodiment, the modem data pump task 314 periodically execute a call to the performance task 320 to retrieve the real-time error measure and to determine whether the real-time error measure exceeds the predetermined threshold error count.

For example, a modem data transfer sequence at a baud rate of 14,400 could consume most of the available MIPS of the DSP 61 because the data pump manager task 312 and the modem data pump task 314 are assigned the highest priority by the DSP-OS dispatcher task 146. If the real-time error measure indicates that DSP drivers are reporting a significant number of real-time errors, then the data pump manager task 312 or the modem data pump task 314 renegotiates the baud rate for the modem transfer underway down to 9600 or 4800 baud. The reduced baud rate increases the available MIPS of the DSP 61 for the lower priority DSP tasks. The data pump manager task 312 and the modem data pump task 314 implement existing modem protocols for renegotiating the baud rate during a transfer sequence. Such renegotiation protocols are also employed if modem data errors are detected or if ambiguous data is received during a modem data transfer sequence.

The host audio driver 164 causes the DSP-OS dispatcher task 146 to create an audio DSP-OS task 252. The audio DSP-OS task 252 performs sound file record and playback functions through a DSP stereo audio codec driver 280. The DSP stereo audio codec driver 280 communicates through the audio interface circuit 68 to the stereo audio codec circuit 54. The DSP stereo audio codec driver 280 is interrupt driven according to interrupts generated by the stereo audio codec 54 through the audio I/F 68.

The audio DSP-OS task 252 functions as a server for the host audio driver 164. The audio DSP-OS task 252 performs the commands requested by the host audio driver 164 according to messages routed through the corresponding mailboxes.

During audio record operations, the DSP stereo audio codec driver 280 receives sound samples from the stereo audio codec circuit 54. The sound samples from the stereo audio codec circuit 54 comprise 16 bit integer data values. The DSP stereo audio codec driver 280 converts the sound samples into a sound data stream having the standard data format, and transfers the sound data stream to the audio DSP-OS task 252.

The DSP stereo audio codec driver 280 continuously requests data buffers from the audio DSP-OS task 252 while transferring the sound data stream to the audio DSP-OS task 252. The DSP stereo audio codec driver 280 writes a block of the sound data stream into each data buffer and then requests a new data buffer for the next sound data block. The audio DSP-OS task 252 may not receive sufficient DSP 61 processor time to process the data buffer requests from the DSP stereo audio codec driver 280 if higher priority DSP tasks cause an exhaustion of available MIPS on the DSP 61.

If the DSP stereo audio codec driver 280 does not receive a new buffer from the audio DSP-OS task 252 and loses incoming sound data, then the DSP stereo audio codec driver 280 logs a real-time error. Also, if the DSP stereo audio codec driver 280 detects that the last data buffer has not been processed by the audio DSP-OS task 252, then the DSP stereo audio codec driver 280 logs a real-time error. The DSP stereo audio codec driver 280 may log the real-time errors directly to the performance task 320. Alternatively, the DSP stereo audio codec driver 280 may report the real-time errors to the audio DSP-OS task 252 when queried by the audio DSP-OS task 252 for real-time errors. The audio DSP-OS task 252 then logs the reported real-time errors to the performance task 320 if real-time error logging for the audio DSP-OS task 252 is enabled.

The audio DSP-OS task 252 preprocesses the sound data stream through a compression driver 210 according to the requirements of the host application program 202. The preprocessed sound data stream is then transferred to the host audio application program 202 through the device independent I/O interface of the DSP host driver 130, and up through the host audio driver 164.

The compression driver 210 converts the sound data stream from the standard data format into a compressed data format. The PCM audio driver 214 converts the sound data stream from the standard data format into a PCM format for Waveform files.

During audio playback operations, the host audio application program 202 transfers a sound data stream to the host audio driver 164 through the audio application program interface 171. The host audio driver 164 transfers the sound data stream to the host DSP driver 122 through the DSP interface 120. The audio DSP-OS task 252 receives the sound data stream from the host DSP driver 122 through the compression driver 210 or the PCM audio driver 214 according to the requirements of the host application program 202.

The compression driver 210 converts the sound data stream from the compressed data format into the standard data format during audio playback. The PCM audio driver 214 converts the sound data stream from the PCM format for Waveform files into the standard data format during playback.

The audio DSP-OS task 252 then transfers the standard format sound data stream to the DSP stereo audio codec driver 280 through the device independent I/O interface. The DSP stereo audio codec driver 280 converts the sound data stream into the 16 bit integer data values required by the stereo audio codec circuit 54 and then transfers the decompressed 16 bit sound data values to the stereo audio codec circuit 54 to generate sound playback.

The DSP stereo audio codec driver 280 continuously requests data buffers containing the sound data stream from the audio DSP-OS task 252 while receiving the standard format sound data stream from the audio DSP-OS task 252. The audio DSP-OS task 252 may not receive sufficient DSP 61 processor time to pass the data buffers to the DSP stereo audio codec driver 280 if higher priority DSP tasks cause an exhaustion of available MIPS on the DSP 61. If the DSP stereo audio codec driver 280 does not receive a new buffer from the audio DSP-OS task 252 at the appropriate time required by the audio playback operation, then the DSP stereo audio codec driver 280 logs a real-time error. The DSP stereo audio codec driver 280 may log the real-time errors directly to the performance task 320. Alternatively, the DSP stereo audio codec driver 280 may report the real-time errors to the audio DSP-OS task 252 when queried by the audio DSP-OS task 252 for real-time errors. The audio DSP-OS task 252 then logs the reported real-time errors to the performance task 320 if real-time error logging for the audio DSP-OS task 252 is enabled.

For one embodiment, the host audio application program 202 transfers sound data values from Waveform sound files to the audio DSP-OS task 252 during audio playback operations. The Waveform sound samples conform to the Waveform application program interface provided by Microsoft® Corporation for processing.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for dynamically scaling consumption of processor cycles by a task executing in a multi-tasking input/output subsystem including a plurality of tasks each associated with an input/output driver, comprising the steps of:

executing an error logging function that increments a global error count variable each time a real-time error is reported by a first input/output driver of the subsystem;

determining a real-time error measure indicating a number of real-time errors reported by the first input/output driver by averaging a number of real-time errors reported by the first input/output driver over a predetermined time interval; and reducing the consumption of processor cycles used by the task if the real-time error measure exceeds a predetermined threshold, wherein the task is associated with a second input/output driver.

2. The method of claim 1, where the first input/output driver and the second input/output driver are a same input/output driver.

3. The method of claim 1, wherein the first input/output driver is associated with an input/output task that queries the first input/output driver for the number of real-time errors.

4. The method of claim 1, wherein the first input/output driver reports a real-time error when the associated input/output task fails to allocate a buffer for data to be transferred to the first input/output driver.

5. The method of claim 4, wherein the associated input/output task comprises a modem task for transferring a modem data stream over a telephone line through a telephony driver according to a data transfer rate equal to a first baud rate.

6. The method of claim 5, wherein the step of reducing the consumption of processor cycles used by the task comprises the step of renegotiating the data transfer rate to a second baud rate such that the second baud rate is less than the first baud rate.

7. An apparatus for dynamically scaling consumption of processor cycles used by a task executing in a multi-tasking input/output subsystem comprising:

error measurement logic that determines a real-time error measure indicating a number of real-time errors reported by a first input/output driver executing in the multi-tasking input/output subsystem by averaging the number of real-time errors reported by the input/output driver over a predetermined time interval; and processor cycle reduction logic coupled to the error measurement logic that reduces the consumption of processor cycles used by a second input/output driver when the real time error measure exceeds a predetermined threshold.

8. The apparatus of claim 7, wherein the input/output driver further includes logic that reports the number of real-time errors by calling an error logging function provided by a performance monitoring task executing in the multi-tasking input/output subsystem.

9. The apparatus of claim 7, wherein the input/output driver further includes logic that reports the number of real-time errors by incrementing a global error count variable.

10. The apparatus of claim 7, wherein the first input/output driver further comprises a modem device that transfers a modem data stream over a telephone line through a telephony driver according to a data transfer rate equal to a first baud rate.

11. The apparatus of claim 10, wherein the processor cycle reduction logic further includes logic that reduces the consumption of processor cycles by the modem device by renegotiating the data transfer rate to a second baud rate such that the second baud rate is less than the first baud rate.

* * * * *